Patented Nov. 5, 1940

2,220,685

UNITED STATES PATENT OFFICE 2,220,685

REVERTIBLE EMULSIONS WITH HIGH SOLIDS CONTENT

Robert J. Myers, Elkins Park, and Harold C. Cheetham, Philadelphia, Pa., assignors to The Resinous Products & Chemical Company, Philadelphia, Pa.

No Drawing. Application March 8, 1939, Serial No. 260,525

9 Claims. (Cl. 260—6)

This invention relates to emulsions of drying oil-modified alkyd resins suitable for use in the preparation of paints. It relates particularly to a water-in-oil type emulsion containing a minimum amount of water and a high percentage of drying oil-modified alkyd resin, which on dilution with water readily reverts to an oil-in-water type emulsion that is suitable for use in the preparation of paints.

Aqueous emulsions of drying oil-modified alkyd resins are being offered commercially to paint manufacturers as a paint vehicle. To be satisfactory for the paint manufacturers' purpose these emulsions must be stable, easily pigmented, readily dilutible with water, and when applied to a surface must brush out smoothly and dry down to a continuous, adherent coating. Experience has shown that, to obtain all these qualities, peptized casein is the most satisfactory emulsifying agent to use. It produces very satisfactory oil-in-water type alkyd emulsions that can be readily pigmented and diluted with water to the desired brushing or spraying consistency.

Theoretically, an oil-in-water type emulsion requires the presence of at least 26% water phase and we have repeatedly observed that, when attempts have been made to concentrate a drying oil-modified alkyd resin emulsion beyond approximately 70% resin, the emulsion inverts to a water-in-oil type emulsion. When a resin emulsion prepared with casein is allowed to invert to a water-in-oil type emulsion, the addition of water does not easily lead to reversion. In some instances the water is not taken up by the mass, and in others the water is absorbed slowly but the quality of the emulsion becomes progressively worse and eventually "breaks" with the separation of two phases. For these reasons the emulsions of drying oil-modified alkyd resin that are being offered commercially have contained from 40 to 60% water.

The main object of this invention is to provide a water-in-oil type, drying oil alkyd emulsion which is capable of easy reversion to an oil-in-water type. A further object of the invention is to provide a method for preparing a water-in-oil type drying oil alkyd emulsion which, when extended with water and reverted to an oil-in-water type emulsion, yields an emulsion suitable for use in the preparation of paints. Other objects will appear from the description of the invention which follows.

These objects have been accomplished through our discovery that an invertible and revertible drying oil alkyd emulsion can be prepared by using casein as the emulsifying agent and including in the emulsion an auxiliary agent having the quality of reverting a water-in-oil emulsion to an oil-in-water emulsion. These auxiliary agents which will hereinafter be referred to as "reverting agents" are certain surface-active compounds which act to determine the phases of the emulsion. It is known that some surface-active compounds favor the formation of oil-in-water type emulsions while others favor the water-in-oil type. We have found that agents capable of reverting a water-in-oil emulsion to an oil-in-water emulsion, when present in a water-in-oil type drying oil alkyd emulsion prepared with casein, cause a reversion of phase when these emulsions are extended with water and that the casein present will then perform its known function of producing a stable emulsion having all the necessary qualifications of an emulsion paint vehicle.

Among the reverting agents that may be used in practicing the invention we have found the fatty acid soaps of oxygen-containing amines the most suitable. Such amines as triethanolamine, diethanolamine, monoethanolamine, mixtures of these amines, morpholine, certain phenolic amines as those obtainable by condensing phenol, formaldehyde, and dimethylamine when made into soaps with fatty acids of drying, semi-drying and non-drying oils give compounds that are very effective reverting agents. The sodium soaps of fatty acids may also be used but have the disadvantage of reducing the water-resistance of the final paint film. Numerous other surface-active compounds may also be used but, with regard for the quality of the reverted emulsion and for the paint film obtainable from it, the soaps of unsaturated fatty acids and oxygen-containing amines appear to be the most satisfactory.

While the reverting agents are necessary for an easy reversion of the emulsion from a water-in-oil type to an oil-in-water type, the diluted material (oil-in-water emulsion) is a dispersion of resin in water, in which casein performs the role of the emulsifying agent. The reverting agents contribute little or nothing to the emulsification of the resin in the diluted form.

In addition to the reverting agent it is frequently desirable to have a small amount of free sodium hydroxide also present in the emulsion. The addition of about ½% caustic soda greatly facilitates the ease of reversion without in any way detrimentally affecting the quality of the paint film.

The high solids content, water-in-oil type dispersions herein described are prepared by making a concentrated ammoniacal dispersion of casein and combining it with the resin, driers and reverting agent. In the preferred procedure the resin, mixed with driers, reverting agent and alkali if desired, is slowly added, preferably while hot, with good stirring to the casein paste. Although at first an oil-in-water type emulsion may be formed, no difficulty is experienced in inverting this as more resin is added. In another method of combining the ingredients the casein dispersion is added to the resin. The water-in-oil emulsion thus formed reverts easily to the oil-in-water type emulsion upon dilution, but the particle size of the resulting emulsion is not so fine as from emulsions prepared according to the preferred procedure. It is also possible to combine the reverting agent with the casein and combine this mixture with the resin, but again particle size tends to be coarser than by the preferred procedure. The water-in-oil emulsion resulting from any of these procedures is lightly colored, usually fairly clear, viscous, and readily dilutible by the addition of small quantities of water, which may be incorporated with slow stirring and slight warming, if desired.

The preferred dispersions of casein contain, on the basis of 14 to 18 parts of water, from about 8 to about 16 parts of casein, from about 2 to about 6 parts of 28% ammonia, from about one to about 4 parts of a buffering agent such as boric acid and, if desired, about one part or more of a viscosity stabilizing agent, such as an alginate, as disclosed in our co-pending application Serial No. 260,524 filed on even date. The casein is peptized or solubilized with these ingredients into a paste or rubbery mass in a suitable mixing machine. This may be done at room temperature or at a warmer temperature. Preserving agents, such as phenols, may be added if desired.

The air-drying alkyd resin, such as one made with a polybasic acid, a drying oil or drying oil acid, and a polyhydric alcohol, is prepared in the usual way. The preferred alkyd resin is made from phthalic anhydride, linseed or tung oil and glycerine. Soya bean or castor oil may be used in conjunction with the drying oils. To this modified alkyd resin is generally added from one to 10 per cent. of a harder resin which is compatible therewith, such as a maleic acid-rosin ester.

If these resinous materials are freshly prepared, they should be allowed to cool from reaction temperature to 80–90° C. Soluble driers are then added, 0.2% lead and 0.05% cobalt based on the weight of the drying oil-modified alkyd resin being satisfactory. The reverting agent is incorporated, preferably with the resin, to the extent of about 6 to 10 parts of reverting agent to about 80 to 85 parts of resin. A small amount (about one part) of sodium hydroxide, in the form of a concentrated solution, may be incorporated in the resin mixture. This resin mixture is then ready for incorporating with the casein paste. Preferably 5 to 6 parts of the resin mixture are combined with one part of the casein dispersion.

By the use of the materials just described and by the procedures outlined, there results an emulsion of high solids content (treating all non-volatile matter as solids) and with a water content always less than 20%, which may be kept for a long period of time, which is stable in its concentrated form, which yields stable oil-in-water type emulsions on dilution with water in spite of reversion of the type of emulsion, and which, when diluted, may be used as a coating material, or may be satisfactorily pigmented for use as a water-base paint.

The process of producing these emulsions of high solids content is further illustrated by the following specific examples.

*Example 1*

A mixture of 4.8 parts of casein, 9 parts of water, one part of commercial ammonium hydroxide and 0.6 part of boric acid is worked into a stiff paste. To this is gradually added a mixture of 4 parts of triethanolamine ricinoleate, 3.3 parts of triethanolamine oleate, 5 parts of a 10% sodium hydroxide solution and 83.3 parts of a drying oil-modified alkyd resin prepared by heating 24.3 parts of phthalic anhydride, 15.5 parts of linseed oil fatty acid, 28.0 parts of soya bean oil fatty acids, and 15.5 parts of glycerine at approximately 240° C. until the acid number of the product is below 15. The resin mixture is kept at 60° C. while being added slowly and with vigorous stirring to the casein paste. A water-in-oil type emulsion containing about 86% solids is thus obtained. It is capable of being reverted to the oil-in-water type upon the addition of small quantities of water and slow, efficient stirring.

*Example 2*

A mixture of 67 parts of casein, 15 parts of ammonium hydroxide, 80 parts of water, and 8 parts of boric acid is worked into a rubbery mass. This is placed in a Werner-Pfleiderer mixer and the following resin mixture is added slowly with stirring:—40 parts of triethanolamine ricinoleate, 33 parts of triethanolamine oleate, 817 parts of the oil-modified alkyd resin used in Example 1, 16 parts of a maleic acid-rosin-glyceride prepared by heating 11.85 parts by weight of rosin, 1.78 parts of maleic anhydride and 2.37 parts of glycerine at 250° C. for about eight hours until the acid number of the resulting resin falls below 40, 26 parts of a cobalt and lead drier, and 25 parts of 20% sodium hydroxide solution. With extensive stirring a clear, pink-colored, water-in-oil type emulsion containing about 90% solids is obtained.

The material diluted to 50% solids is pigmented with a mixture of barium titanium pigment, and titanium dioxide (or other suitable pigments). The brushing and flow qualities of the paints made in this manner are of an excellent character.

*Example 3*

6.7 parts of casein, 1.5 parts of commercial ammonium hydroxide, 0.84 part of sodium alginate, 8.0 parts of water, and 0.8 part of boric acid are worked together into a tough, rubbery mass.

Into this is worked slowly, with vigorous stirring, the following mixture:—4.4 parts of triethanolamine ricinoleate, 3.6 parts of triethanolamine oleate, 81.7 parts of drying oil-modified alkyd resin, 1.6 parts of a maleic acid-rosin-glyceride resin, 2.6 parts of an oil-soluble cobalt-lead drier, and 2.5 parts of a 20% sodium hydroxide solution. The compositions of the alkyd resin and the maleic-rosin-glyceride were the same as shown in Examples 1 and 2. The resulting water-in-oil emulsion can be reverted to an oil-in-water emulsion upon dilution with water, such emulsion being capable of pigmentation and brushing application as a paint, and possessing, as well, remarkable viscosity stability.

*Example 4*

6.7 parts of casein, 1.5 parts of ammonium hydroxide, 0.8 part of boric acid and 10 parts of water were worked together into a stiff paste. To this was added with stirring a mixture prepared from 83.3 parts of alkyd type resins prepared by heating phthalic anhydride, linseed oil fatty acid, castor oil fatty acid, and glycerine at 240–250° C. for about three hours, 2.6 parts of drier, 4.0 parts of morpholine ricinoleate, and 3.3 parts of triethanolamine oleate. The resulting emulsion was a water-in-oil type emulsion, which was satisfactorily reverted upon addition of water.

*Example 5*

6.7 parts of casein were peptized in 8 parts of water containing 0.8 part of boric acid and 1.5 parts of ammonium hydroxide. This paste was then mixed with 4.0 parts of diethanolamine ricinoleate, 3.3 parts of triethanolamine oleate, and 2.5 parts of a 20% sodium hydroxide solution. Finally 83.3 parts of a resin mixture consisting of (1) 81.6 parts of an alkyd resin prepared from 24.1 parts of phthalic anhydride, 15.1 parts of linseed oil fatty acid, 27.4 parts of soya bean oil fatty acids, and 15.1 parts of glycerine heated at 250° C. to an acid number of 15, (2) 1.7 parts of a resin, made by heating 1.4 parts of rosin and 0.2 part of maleic acid at 200° C. for 2 hours, and (3) 2.6 parts of drier, were slowly added with vigorous stirring to the paste of casein and soap. The resulting water-in-oil type emulsion was reverted upon the addition of water and was a satisfactory paint base, although the particles of this emulsion were coarser than particles of emulsions made by the preferred method.

The high solids content, water-in-oil type, drying oil-alkyd emulsions made in accordance with this invention have numerous advantages over the previously available oil-in-water type emulsions. They possess the economic advantage of containing a minimum of water which results in a substantial saving in storing and shipping. They have the technical advantages of permitting lengthy storage without deterioration of the emulsion or change in its viscosity. Since they are semi-solids, they are more easily handled than the thick liquid oil-in-water type emulsions. Yet, by merely diluting them with water high quality oil-in-water type emulsions are obtained possessing all the desirable properties of the casein emulsified drying oil alkyds.

This invention is concerned primarily with the preparation of emulsions for use as a paint vehicle and for this purpose drying oil-alkyd resins are the ones that primarily come into consideration. The principles, upon which the invention is based, are, however, applicable to emulsions of non-drying oil alkyds which may be used, for instance, in the preparation of textile finishing compositions. Likewise, the drying oil alkyd emulsions are not limited in usefulness to the preparation of paints but may be used for coating, sizing and waterproofing paper, fabrics, leather, plaster, stucco, brick, tile, concrete, wallboard, asbestos shingles, linoleum, bituminous compositions and other porous materials. Paints made by diluting and pigmenting the emulsions are useful and economical for interior and exterior use and particularly for painting porous materials, such as plaster, wall-board, stucco, brick, wood, and concrete.

We claim:

1. A method of producing high solids content, revertible water-in-oil type emulsions of a drying oil-modified alkyd resin, which comprises peptizing 8 to 16 parts of casein with a solution containing 14 to 18 parts of water, 2 to 6 parts of 28% ammonia solution, and one to 4 parts of boric acid, preparing a mixture containing 80 to 85 parts of a drying oil-modified alkyd type resin, 2 to 3 parts of a cobalt-lead drier, 6 to 10 parts of triethanolamine soap from oleic and ricinoleic acids, one to 3 parts of a maleic acid-rosin-glyceride and from one-half to one part of sodium hydroxide, and slowly adding with vigorous agitation about 5 to 6 parts of the resin mixture to about one part of the casein dispersion.

2. A method of preparing a water-in-oil type emulsion of high solids content, which comprises mixing a small amount of triethanolamine soap and of sodium hydroxide with a drying oil-modified alkyd type resin, peptizing casein in a buffered ammoniacal solution, and combining with agitation about one part of the casein dispersion with 5 to 6 parts of the resin mixture.

3. A process of producing a revertible, water-in-oil type, high solids content emulsion of an oil-modified alkyd resin, which comprises intimately mixing a casein solution containing less than 20% water, based on the final emulsion, an oil-modified alkyd resin, and a surface-active compound which is a salt of an oxygen-containing amine and a fatty acid.

4. A process of producing a revertible water-in-oil type, high solids content emulsion of an oil-modified alkyd resin, which comprises intimately mixing a casein solution containing less than 20% water, based on the final emulsion, an oil-modified alkyd resin, and an ethanolamine salt of a fatty acid.

5. A process of producing a revertible, water-in-oil type, high solids content emulsion of an oil-modified alkyd resin, prepared by heating phthalic anhydride, linseed oil fatty acid, soya bean oil fatty acid, and glycerine until the acid number of the product is less than 15, which comprises intimately mixing a casein solution containing less than 20% water, based on the final emulsion, said alkyd resin, driers, and a surface-active compound which is a salt of an oxygen-containing amine and a fatty acid.

6. As a new composition of matter a water-in-oil type emulsion in which an oil-modified alkyd resin forms the continuous phase, said composition containing, in addition to the oil-modified alkyd resin, casein, less than 20% water, and a surface-active compound which is a salt of an oxygen-containing amine and a fatty acid.

7. A water-in-oil type emulsion, revertible on dilution with water, which contains 70 to 80% of an oil-modified alkyd resin, 4 to 8% of casein dispersed in water, and 5 to 9% of ethanolamine soaps of unsaturated fatty acids.

8. A water-in-oil type emulsion, revertible on dilution with water, which contains 70 to 80% of a modified alkyd resin, prepared by heating phthalic anhydride, linseed oil fatty acid, soya bean oil fatty acid, and glycerine until the acid number of the product is less than 15, 4 to 8% of casein dispersed in water, and 5 to 9% of triethanolamine soap of an unsaturated fatty acid.

9. A water-in-oil type emulsion, revertible on dilution with water, which contains 70 to 80% of a resinous composition containing a modified alkyd resin, prepared by heating phthalic anhydride, linseed oil fatty acid, soya bean oil fatty acid, and glycerine until the acid number of the reaction mixture is less than 15 and a small amount of a resin, prepared by heating rosin, maleic anhydride and glycerine until the acid number is less than 40, 4 to 8% of casein dispersed in water, and 5 to 9% of a triethanolamine soap of an unsaturated fatty acid.

ROBERT J. MYERS.
HAROLD C. CHEETHAM.